United States Patent
Dawra et al.

(10) Patent No.: US 7,405,677 B2
(45) Date of Patent: Jul. 29, 2008

(54) APPARATUS, SYSTEM, AND METHOD FOR INCREMENTAL ENCODING CONVERSION OF XML DATA USING JAVA

(75) Inventors: Anshul Dawra, San Jose, CA (US); Bilung Lee, Fremont, CA (US); Paul Arnold Ostler, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 11/463,269

(22) Filed: Aug. 8, 2006

(65) Prior Publication Data

US 2008/0036629 A1 Feb. 14, 2008

(51) Int. Cl.
*H03M 7/00* (2006.01)

(52) U.S. Cl. ............................. 341/50; 341/51; 717/143

(58) Field of Classification Search .................... 341/50, 341/51, 52, 55; 709/220–223; 717/143
See application file for complete search history.

(56) References Cited

U.S. PATENT DOCUMENTS

| | | | |
|---|---|---|---|
| 6,370,531 B1 | 4/2002 | Boutcher et al. ............... 707/10 |
| 6,754,884 B1 * | 6/2004 | Lucas et al. .................. 717/108 |
| 6,999,082 B2 | 2/2006 | Nishimura .................. 345/467 |
| 7,013,425 B2 | 3/2006 | Kataoka ..................... 715/513 |
| 7,194,485 B2 * | 3/2007 | Kaipa et al. ............... 707/104.1 |
| 2002/0069224 A1 | 6/2002 | Asai et al. .................... 707/513 |
| 2002/0143824 A1 | 10/2002 | Lee et al. ..................... 707/523 |
| 2003/0018466 A1 | 1/2003 | Imaura ........................ 704/6 |
| 2003/0110446 A1 * | 6/2003 | Nemer ........................ 715/513 |
| 2004/0064503 A1 | 4/2004 | Karakashian et al. ....... 709/203 |
| 2004/0143791 A1 | 7/2004 | Ito et al. ..................... 715/513 |
| 2004/0216086 A1 * | 10/2004 | Bau ........................... 717/114 |
| 2004/0255048 A1 | 12/2004 | Lev Ran et al. ............. 709/249 |
| 2005/0071756 A1 | 3/2005 | Cipresso et al. ............. 715/513 |
| 2005/0262511 A1 | 11/2005 | Taniai et al. ................. 719/310 |
| 2005/0278616 A1 | 12/2005 | Eller ........................... 715/513 |

* cited by examiner

*Primary Examiner*—Brian Young
(74) *Attorney, Agent, or Firm*—Kunzler & McKenzie

(57) ABSTRACT

An apparatus and method are disclosed for converting XML data to a destination encoding format. A receive module receives a request for bytes of XML data in a destination encoding format streamed from a source XML file. A transfer module transfers the requested bytes from a byte conversion buffer to a request buffer in response to the request and the byte conversion buffer having at least the requested bytes. A conversion module, in response to the byte conversion buffer lacking the requested quantity of bytes, transfers part of the requested bytes to the request buffer, fetches input bytes from an XML file, stores the bytes in a receive buffer, transfers the input bytes through a byte-to-character converter to a character conversion buffer, transfers the characters through a character-to-byte converter to the byte conversion buffer, and transfers enough bytes to the request buffer to satisfy the request.

9 Claims, 3 Drawing Sheets

APPARATUS, SYSTEM, AND METHOD FOR INCREMENTAL ENCODING CONVERSION OF XML DATA USING JAVA

BACKGROUND OF THE INVENTION

1. Field of the Invention

This invention relates to Extended Markup Language ("XML") data conversion and more particularly relates to XML data conversion from one encoding format to another while streaming a portion of an XML data file.

2. Description of the Related Art

The default encoding for an XML document is the 8-bit Unicode Transformation Format ("UTF-8"). Nevertheless, XML data can use various kinds of encoding representations. In particular, while an XML document can be stored in UTF-8 encoding in a remote database, it can also be saved in a region specific encoding on a local file system. Transferring an XML document encoded in UTF-8 from a remote database to a local file system in a region-specific encoding format requires conversion of the XML document from one encoding to another.

Encoding conversion utilities, also known as transcoders, may be used to facilitate the conversion process. However, typical transcoders require an XML document to be completely available before conversion begins. This may not be a problem when an XML document is relatively small in size. In such case, an entire XML document can be transferred from the remote database and then converted into the region specific encoding on the local system. Problems arise when the XML document is large in size and the local system is constrained in memory, bandwidth, and/or storage resources. Transferring large XML documents from a remote database may cause the local system to run out of memory. Advanced databases provide streaming materialization of large XML documents allowing data to be requested on an as-needed basis. This helps local systems avoid being bombarded with a large amount of data. Unfortunately, typical transcoders do not provide necessary interoperability with streaming materialization from databases.

Conversion using Java causes other problems. One issue is that in Java there is no support for direct conversion between any two arbitrary encoding representations. An intermediate character representation is necessary to convert from one encoding representation to another. For example, an XML document in UTF-8 encoding must first be converted into a character representation, which then can be converted into a region specific encoding format.

From the foregoing discussion, it should be apparent that a need exists for an apparatus, system, and method for converting streamed XML data, representing only a portion of an XML document, from one encoding format to another using Java. Beneficially, such an apparatus, system, and method would be request driven and would use available Java converters.

SUMMARY OF THE INVENTION

The present invention has been developed in response to the present state of the art, and in particular, in response to the problems and needs in the art that have not yet been fully solved by currently available XML converters. Accordingly, the present invention has been developed to provide an apparatus, system, and method for converting XML data from a source encoding format to a destination encoding format in response to at least a portion of an XML file that overcome many or all of the above-discussed shortcomings in the art.

The apparatus to convert XML data is provided with a plurality of modules configured to functionally execute the necessary steps of fetching at least a portion of an XML file in a source encoding format and converting the XML data to a destination encoding format. These modules in the described embodiments include a receive module that receives a request for a quantity of output bytes. The output bytes comprise bytes of XML data in a destination encoding format streamed and converted from at least a portion of a source XML file in a source encoding format. The apparatus includes a transfer module that transfers the requested quantity of output bytes from a byte conversion buffer to a request buffer in response to the request and the byte conversion buffer having at least the requested quantity of output bytes.

The apparatus includes a conversion module that transfers a portion of the requested quantity of output bytes to the request buffer from the byte conversion buffer. The conversion module fetches a quantity of input bytes from an XML file at a source and stores the quantity of input bytes in a receive buffer. The input bytes include bytes of XML data in the source encoding format comprising at least a portion of the XML file at the source. The conversion module transfers the quantity of input bytes in the receive buffer through a byte-to-character converter to a character conversion buffer. The character conversion buffer includes characters in a Java programming language character format. The conversion module transfers the quantity of characters in the character conversion buffer through a character-to-byte converter to the byte conversion buffer. The bytes of XML data in the byte conversion buffer include XML data in the destination encoding format. The conversion module transfers a quantity of bytes from the byte conversion buffer to the request buffer to satisfy the request. The conversion module does the preceding in response to the request and the byte conversion buffer lacking the requested quantity of output bytes.

In one embodiment, the request buffer is a buffer at the destination. In another embodiment, the destination encoding format is a region-specific encoding format. In another embodiment, the conversion module is further configured to request, receive, convert, and transfer XML data to the destination repeatedly until the requested quantity of output bytes is transferred to the destination.

In one embodiment, the quantity of input bytes stored in the receive buffer is equal to a size of the receive buffer. In another embodiment, the character-to-byte converter converts characters to bytes using Java and the byte-to-character converter converts bytes to characters using Java. In yet another embodiment, the request includes the destination encoding format.

A method of the present invention is also presented for converting XML data from a source encoding format to a destination encoding format in response to a request for at least a portion of an XML file. The method in the disclosed embodiments substantially includes the steps necessary to carry out the functions presented above with respect to the operation of the described apparatus. In one embodiment, the method includes receiving a request for a quantity of output bytes, wherein the output bytes comprise bytes of XML data in a destination encoding format streamed and converted from at least a portion of a source XML file in a source encoding format. The method includes transferring the requested quantity of output bytes from a byte conversion buffer to a request buffer in response to the request and the byte conversion buffer having at least the requested quantity of output bytes.

The method includes, in response to the request and the byte conversion buffer lacking the requested quantity of output bytes, transferring a portion of the requested quantity of output bytes to the request buffer from the byte conversion buffer, fetching a quantity of input bytes from an XML file at a source and storing the quantity of input bytes in a receive buffer, transferring the quantity of input bytes in the receive buffer through a byte-to-character converter to a character conversion buffer, transferring the quantity of characters in the character conversion buffer through a character-to-byte converter to the byte conversion buffer, and transferring a quantity of bytes from the byte conversion buffer to the request buffer to satisfy the request. The input bytes include bytes of XML data in the source encoding format comprising at least a portion of the XML file at the source. The character conversion buffer includes characters in a Java programming language character format. The bytes of XML data in the byte conversion buffer include XML data in the destination encoding format.

In a further embodiment, the method includes allocating the receive buffer, allocating the character conversion buffer, wherein the character conversion buffer is at least the size of the request buffer; and allocating the byte conversion buffer, wherein the byte conversion buffer is the size of the character conversion buffer multiplied by a sizing factor. The sizing factor based on the ratio of the size of bytes in the destination encoding format to the size of characters.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
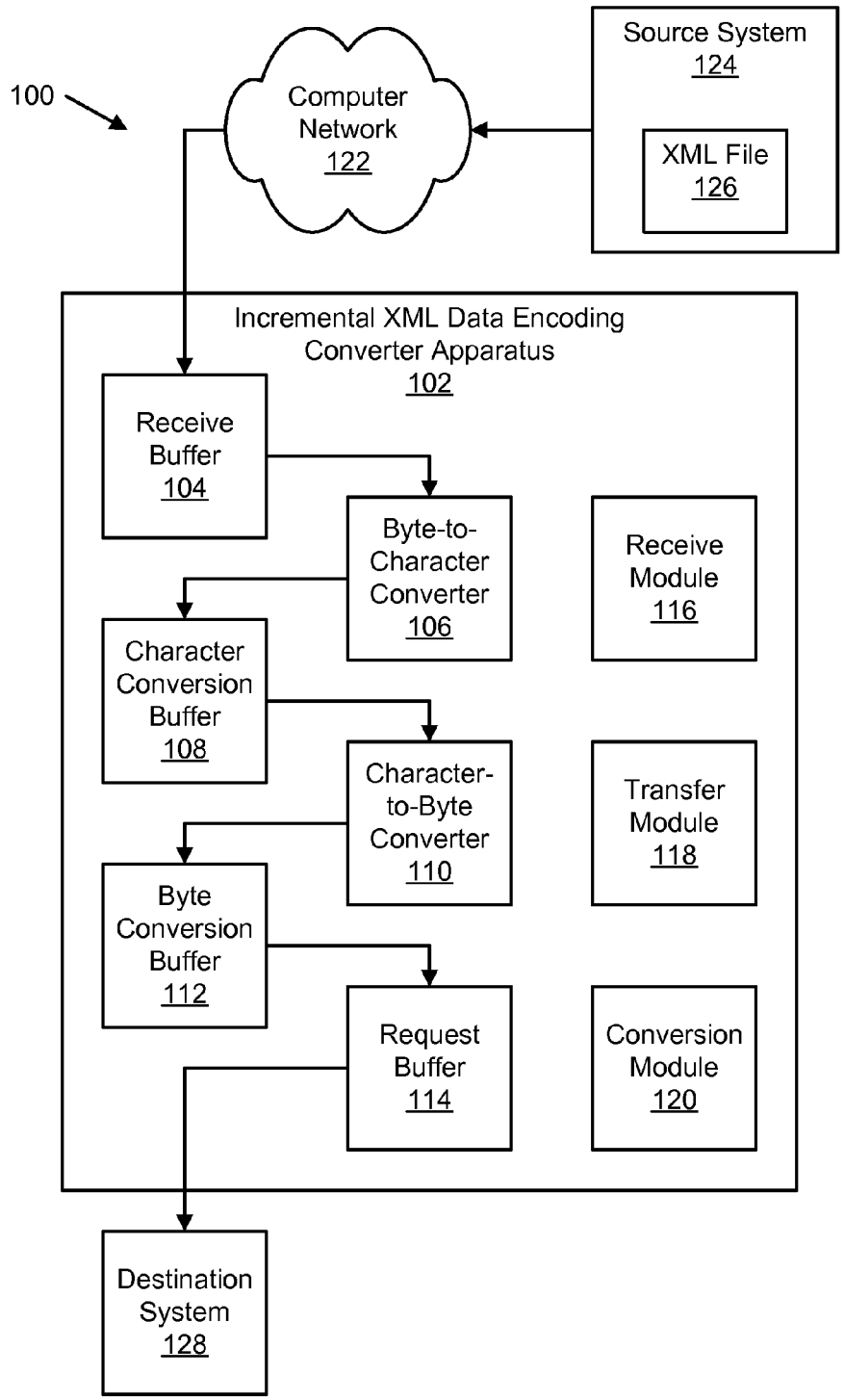
FIG. 1 is a schematic block diagram illustrating one embodiment of an apparatus to convert XML data from a source encoding format to a destination encoding format in response to a request for at least a portion of an XML file in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts a system 100 to convert XML data from a source encoding format to a destination encoding format in response to a request for at least a portion of an XML file. The system 100 includes an incremental XML data encoding converter apparatus 102 (hereinafter "XML converter") that includes a receive buffer 104, a byte-to-character converter 106, a character conversion buffer 108, a character-to-byte converter 110, a byte conversion buffer 112, a request buffer 114, a receive module 116, a transfer module 118, and a conversion module 120, which are described in detail below. The system 100 also includes a computer network 122 coupled to a source system 124 with an XML file 126 and to the XML converter 102. The XML converter 102 is in communication with a destination system 128. The source system 124 and destination system 128 may comprise a file system, a database, a server, a PC, or a portable device.

The system 100 includes an incremental XML data encoding converter apparatus 102. The XML converter 102 generally receives streamed XML data in a source encoding format (typically UTF-8 but possibly any other encoding representation) and delivers XML data in a destination format in response to a request for a specified quantity of XML data. Typically, the destination encoding format is a region-specific encoding format corresponding to the encoding format typically used in the region where the destination is located. Streamed data from a source system 124 is typically from a XML file 126 in a source encoding format. For example, the source and destination XML encoding formats may include American Standard Code for Information Interchange ("ASCII"), which is used by nations using the English alphabet, Big-5, which is typically used in Taiwan and Hong Kong for traditional Chinese characters, BG, which is used in China, and the like.

The XML converter 102 may be part of a driver, an adapter, an application, etc. The XML converter 102, in one embodiment, is located in a destination system 128. In another embodiment, the XML converter 102 is located in a WebSphere Application Server. In another embodiment, the XML converter 102 is located in a server that is accessible to, or part of, the computer network 122. The elements of the XML converter 102 may be together or distributed. One of skill in the art will recognize other implementations and locations for the XML converter 102.

The XML converter 102 includes a receive buffer 104 to store bytes of XML data from the XML file 126 streamed through the computer network 122 from the source system 124. The XML file 126 may be a database, a data structure, or other data source containing XML data. The computer network 122 may include the Internet, a wide area network, a local area network, and the like and may include servers, hubs, switches, cable, and other networking equipment and systems. The receive buffer 104 may be allocated and sized based on factors such as available memory, hardware requirements, maximum size of packets of bytes of XML data streamed from the XML file 126, etc.

The XML converter 102 includes a character conversion buffer 108 to store characters in a character encoding format converted from the source encoding format. The character encoding format is typically a Java programming language character format. The character conversion buffer 108 may be sized relative to the receive buffer 104. Characters typically comprise two bytes. So, if the receive buffer 104 is sized L bytes, the character conversion buffer 108 may also be sized to L characters as a maximum size to ensure sufficient space is provided. In another embodiment, the character conversion buffer 108 may be smaller than L characters.

The XML converter 102 includes a byte conversion buffer 112 to store bytes of XML data in the destination encoding format converted from the character encoding format. The byte conversion buffer 112 may be of size L*M where M is the maximum number of bytes per character for the destination encoding format.

In one embodiment, the XML converter 102 includes a request buffer 114 to store bytes of XML data in the destination encoding format. The request buffer 114 may be sized to be N bytes or larger where N is the number of requested bytes in the destination format requested to be sent to the destination system 128 (hereinafter "destination"). In one embodiment, the request buffer 114 is located in the destination system 128. The request buffer 114 is typically a gathering point for bytes of XML data in the destination encoding format ("output bytes") that are to be sent to the destination 128. In one embodiment the buffers 104, 108, 112, 114 operate on a First-in-First-out (FIFO) basis.

When the byte conversion buffer 112 does not include enough output bytes to fulfill a request of N bytes, the bytes in the byte conversion buffer 112 are sent to the request buffer 114 while more bytes are fetched from the source system 124 and converted. When the byte conversion buffer 112 has more output bytes, output bytes are sent to the request buffer 114. When a total of N output bytes are sent to the request buffer 114, the bytes are sent to the destination 128 in a single message. In another embodiment, the XML converter 102 does not include a request buffer 114 and bytes are sent to the destination 128 until the request is fulfilled using multiple messages.

The XML converter 102 includes a byte-to-character converter 106 and a character-to-byte converter 110. The converters 106, 110 are typically standard converters available in the Java programming language and are loaded from a standard Java library. In another embodiment, the converters 106, 110 are custom converters that are written for the XML converter 102. The byte-to-character converter 106 converts bytes of XML data in the source encoding format to characters in the character encoding format and the character-tobyte converter 110 converts characters in the character encoding format to bytes of XML data in the destination encoding format.

The XML converter 102 includes a receive module 116 that receives a request for a quantity of N output bytes in the destination encoding format. The output bytes are streamed to the XML converter 102 and converted from at least a portion of the source XML file 126 in a source encoding format. The request may include an identifier of the source XML file 126 from which bytes of XML data will be fetched or streamed. The request may also include a required destination encoding. Alternatively, the destination encoding format may be a default based on the region from which the request originated. One of skill in the art will recognize other information that may be included in a request.

The XML converter 102 includes a transfer module 118 that transfers the requested quantity of output bytes from the byte conversion buffer 112 to the request buffer 114 in response to the request and the byte conversion buffer 112 together having at least the requested quantity of output bytes. If the byte conversion buffer 112 has O bytes and O is greater than N (the Number requested), the transfer module 118 will transfer N bytes to the request buffer 114 and then transfer the N bytes to the destination 128. The number of available bytes in the byte conversion buffer 112 O will then be reduced by N. When another request is received by the request module 114, another N bytes are transferred by the transfer module 118. This continues until the number of available bytes O is less than the required bytes N.

The XML converter 102 includes a conversion module 120 that acts in response to the byte conversion buffer 112 having less available bytes O than the requested bytes N. The conversion module 120 transfers a portion of the requested quantity of output bytes N to the request buffer 114 from the byte conversion buffer 112. The conversion module 120 then fetches a quantity of input bytes L from the XML file 126 at the source system 124 and stores the L input bytes in the receive buffer 104.

The conversion module 120 then transfers the L input bytes in the receive buffer 104 through a byte-to-character converter 106 to the character conversion buffer 108. The byte-to-character converter 106 converts the L input bytes to P characters in the character encoding format. The conversion module 120 then transfers the P characters in the character conversion buffer 108 through a character-to-byte converter 110 to the byte conversion buffer 112. The character-to-byte converter 110 converts the P characters to Q bytes of output bytes in the destination encoding format. The conversion module 120 then transfers enough output bytes to the request buffer to satisfy the request of N output bytes and the conversion module 120 sends the N bytes in the request buffer 114 to the destination 128.

Figure 2A:
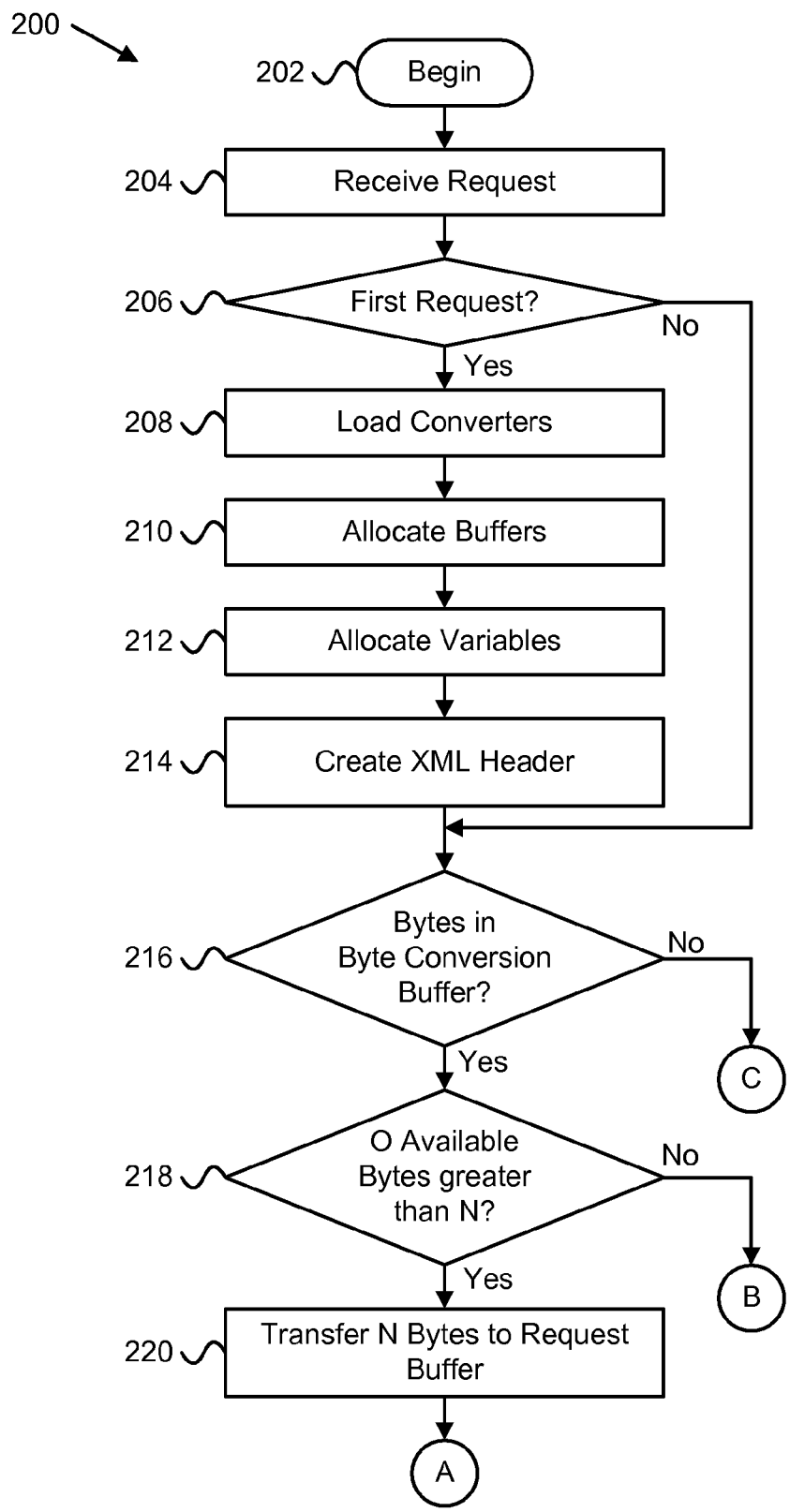
FIG. 2A is a first portion of a schematic flow chart diagram illustrating one embodiment of a method for converting XML data from a source encoding format to a destination encoding format in response to a request for at least a portion of an XML file in accordance with the present invention.
Figure 2B:
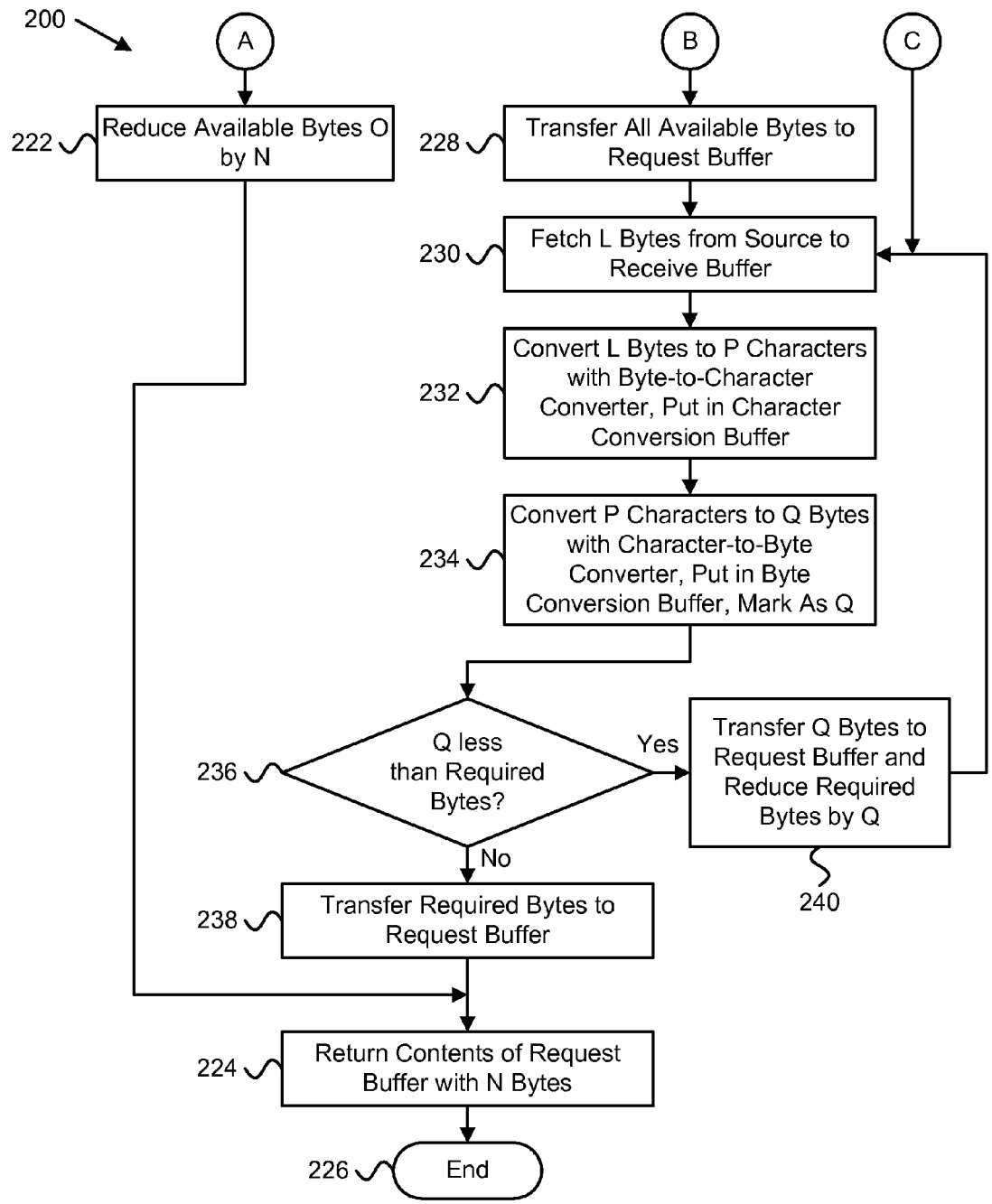
FIG. 2B is a second portion of a schematic flow chart diagram illustrating one embodiment of a method for converting XML data from a source encoding format to a destination encoding format in response to a request for at least a portion of an XML file in accordance with the present invention.

FIGS. 2A and 2B depict a schematic flow chart diagram illustrating one embodiment of a method 200 for converting XML data from a source encoding format to a destination encoding format in response to a request for at least a portion of an XML file in accordance with the present invention. The method 200 begins 202 and the receive module 116 receives 204 a request for output bytes. The receive module 116 determines 206 if the request is a first request for bytes from a source XML file 126. If the receive module 116 determines 206 that the request is a first request, the receive module 116 loads 208 a byte-to-character converter 106 and a character-to-byte converter 110.

The receive module 116 allocates 210 a receive buffer 104, a character conversion buffer 108, a byte conversion buffer 112, and a request buffer 114 (in one embodiment). The receive module 116 allocates 212 a variable for the number of required bytes in a given request, N, and a variable for the number of bytes available in the byte conversion buffer 112, O. The receive module 116 creates 214 an XML header for the bytes that will be sent to the destination 128 and the transfer module 118 determines 216 if there are bytes in the byte conversion buffer 112. Typically, for a first request there will not be bytes in the byte conversion buffer 112. Returning to the first decision block of FIG. 2A, if the receive module 116 determines 206 that the request is not a first request, the transfer module 118 determines 216 if there are bytes in the byte conversion buffer 114.

If the transfer module 118 determines 216 there are bytes in the byte conversion buffer 112, the transfer module 118 determines 218 if the bytes available in the byte conversion buffer 112, O, is greater than the requested output bytes N. If the transfer module 118 determines 218 that the bytes available in the byte conversion buffer 112, O, are greater than the requested output bytes N, the transfer module 118 transfers N output bytes to the request buffer 114. The transfer module 118 reduces 222 the available bytes in the byte conversion buffer 112, O, by N bytes (follow A on FIG. 2A to A on FIG. 2B). The transfer module 118 returns 224 the contents of the request buffer 114 with N output bytes to the destination 128 and the method 200 ends 226.

If the transfer module 118 determines 218 that the bytes available in the byte conversion buffer 112, O, are less than the requested output bytes N, the conversion module 120 transfers 228 a portion of the requested quantity of output bytes to the request buffer 114 from the byte conversion buffer 112 (follow B on FIG. 2A to B on FIG. 2B). Typically, the conversion module 120 transfers 228 all available output bytes, O, to the request buffer 114. The conversion module 120 fetches 230 L input bytes from the XML file 126 in the source file system 124 and stores the L input bytes in the receive buffer 104. The conversion module 120 transfers L bytes from the receive buffer 104 to the byte-to-character converter 106 which converts 232 the L input bytes to P characters and stores the characters in the character conversion buffer 108. The conversion module 120 transfers the P characters from the character conversion buffer 108 to the character-to-byte converter 110 which converts 234 the P characters to Q bytes and stores them in the byte conversion buffer 112.

The conversion module 120 determines 236 if the Q output bytes in the byte conversion buffer 112, plus any bytes left previously in the byte conversion buffer 112, are enough to satisfy the request of N bytes. The request would be satisfied if the bytes previously transferred 228 to the request buffer 114 plus the bytes in the byte conversion buffer 112 are greater than or equal to the required number of bytes N. If the conversion module 120 determines 236 that the output bytes in the byte conversion buffer 112 are enough to satisfy the request of N bytes, the conversion module 120 transfers 238 the required output bytes to the request buffer 114 from the byte conversion buffer 112. The transfer module 118 returns 224 the contents of the request buffer 114 to the destination 128 and the method 200 ends 226.

If the conversion module 120 determines 236 that the Q bytes in the byte conversion buffer 112 are not enough to satisfy the request of N bytes, the conversion module 120 transfers 240 the Q bytes to the request buffer 114 and reduces the number of bytes required to fulfill the request of N bytes by Q. The conversion module 120 then fetches 230 another L bytes from the source XML file 126 and the method 200 continues until the conversion module 120 determines there are enough bytes in the byte conversion buffer 112 to completely satisfy the request. If the transfer module 118 determines 216 there are no bytes in the byte conversion buffer 112, the conversion module 120 fetches 230 L bytes from the source XML file 126 and the method 200 proceeds as indicated (follow C on FIG. 2A to C on FIG. 2B).

The XML converter 102 is advantageous over the prior art because it allows conversion of XML data from one encoding format to another without requiring an entire file to be transferred before conversion. The XLM converter 102 allows requests for packets of XML data streamed from a source and converts the XML data to a specified regional encoding format. The XML converter 102 is also advantageous because it uses Java standard byte-to-character and character-to-byte converters loaded from a Java library.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to convert extended markup language ("XML") data from a source encoding format to a destination encoding format in response to a request for at least a portion of an XML file, the apparatus comprising:
    a receive module configured to receive a request for a quantity of output bytes, wherein the output bytes comprise bytes of XML data in a destination encoding format streamed and converted from at least a portion of a source XML file in a source encoding format;
    a transfer module configured to transfer the requested quantity of output bytes from a byte conversion buffer to a request buffer in response to the request and the byte conversion buffer having at least the requested quantity of output bytes; and
    a conversion module configured
        to transfer a portion of the requested quantity of output bytes to the request buffer from the byte conversion buffer,
        to fetch a quantity of input bytes from an XML file at a source and to store the quantity of input bytes in a receive buffer, wherein the input bytes comprise bytes of XML data in the source encoding format comprising at least a portion of the XML file at the source,
        to transfer the quantity of input bytes in the receive buffer through a byte-to-character converter to a character conversion buffer, the character conversion buffer comprising characters in a Java programming language character format,
        to transfer the quantity of characters in the character conversion buffer through a character-to-byte converter to the byte conversion buffer, the bytes of XML data in the byte conversion buffer comprising XML data in the destination encoding format, and
        to transfer a quantity of bytes from the byte conversion buffer to the request buffer to satisfy the request,
    in response to the request and the byte conversion buffer lacking the requested quantity of output bytes.

2. The apparatus of claim 1, wherein the request buffer comprises a buffer at the destination.

3. The apparatus of claim 1, wherein the destination encoding format is a region-specific encoding format.

4. The apparatus of claim 1, wherein the conversion module is further configured to request, receive, convert, and transfer XML data to the destination repeatedly until the requested quantity of output bytes is transferred to the destination.

5. The apparatus of claim 1, wherein the quantity of input bytes stored in the receive buffer is equal to a size of the receive buffer.

6. The apparatus of claim 1, wherein the character-to-byte converter converts characters to bytes using Java and the byte-to-character converter converts bytes to characters using Java.

7. The apparatus of claim 1, wherein the request includes the destination encoding format.

8. A computer program product comprising a computer readable medium having computer usable program code programmed for converting Extended Markup Language ("XML") data from a source encoding format to a destination encoding format in response to a request for at least a portion of an XML file, the operations of the computer program product comprising:
    receiving a request for a quantity of output bytes, wherein the output bytes comprise bytes of XML data in a destination encoding format streamed and converted from at least a portion of a source XML file in a source encoding format;
    transferring the requested quantity of output bytes from a byte conversion buffer to a request buffer in response to the request and the byte conversion buffer having at least the requested quantity of output bytes; and
    in response to the request and the byte conversion buffer lacking the requested quantity of output bytes,
        transferring a portion of the requested quantity of output bytes to the request buffer from the byte conversion buffer;
        fetching a quantity of input bytes from an XML file at a source and storing the quantity of input bytes in a receive buffer, wherein the input bytes comprise bytes of XML data in the source encoding format comprising at least a portion of the XML file at the source,
        transferring the quantity of input bytes in the receive buffer through a byte-to-character converter to a character conversion buffer, the character conversion buffer comprising characters in a Java programming language character format,
        transferring the quantity of characters in the character conversion buffer through a character-to-byte converter to the byte conversion buffer, the bytes of XML data in the byte conversion buffer comprising XML data in the destination encoding format, and
        transferring a quantity of bytes from the byte conversion buffer to the request buffer to satisfy the request.

9. The computer program product of claim 8, further comprising:
    allocating the receive buffer;
    allocating the character conversion buffer, wherein the character conversion buffer is at least the size of the request buffer; and
    allocating the byte conversion buffer, wherein the byte conversion buffer is the size of the character conversion buffer multiplied by a sizing factor, the sizing factor based on the ratio of the size of bytes in the destination encoding format to the size of characters.

* * * * *